United States Patent
Coblenz et al.

(10) Patent No.: US 9,996,519 B2
(45) Date of Patent: Jun. 12, 2018

(54) CONTEXT SENSITIVE COMPUTATIONS

(75) Inventors: Michael Jeremy Coblenz, Sunnyvale, CA (US); Jeffery Robert Hunter, Sunnyvale, CA (US); Yik Shing Yip, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 1615 days.

(21) Appl. No.: 12/286,648

(22) Filed: Sep. 30, 2008

(65) Prior Publication Data

US 2010/0083090 A1 Apr. 1, 2010

(51) Int. Cl.
*G06F 17/00* (2006.01)
*G06F 17/24* (2006.01)

(52) U.S. Cl.
CPC ................. *G06F 17/246* (2013.01)

(58) Field of Classification Search
CPC ........................ G06F 17/5072; G06F 17/246
USPC ........................................ 715/217–220, 212
See application file for complete search history.

(56) References Cited

U.S. PATENT DOCUMENTS

| 5,680,557 | A  | * | 10/1997 | Karamchetty | ................ | 715/866 |
| 6,598,186 | B1 | * | 7/2003  | McGuire et al. | ............... | 714/48 |
| 2003/0101204 | A1 | * | 5/2003 | Watson | ......................... | 708/206 |
| 2005/0097464 | A1 | * | 5/2005 | Graeber | ................ | G06F 17/246 715/700 |
| 2009/0112922 | A1 | * | 4/2009 | Barinaga | ................... | 707/103 R |
| 2009/0240751 | A1 | * | 9/2009 | Renshaw et al. | ............. | 708/131 |

OTHER PUBLICATIONS

Robin Abraham et al., UCheck: A Spreadsheet Type Checker for End Users, Jun. 12, 2006, Oregon State University, pp. 1-23.*
Mattias Anderson et al., Introducing Units in Spreadsheets, May 17, 2005, pp. 1-9.*
Robin Abraham et al., How to Communicate Unit Error Messages in Spreadsheets, May 21, 2005, ACM, pp. 1-5.*
Tudor Antoniu et al., Validating the Unit Correctness of Spreadsheet Programs, 2004, IEEE, pp. 1-10.*
Michael J. Coblenz, "Using Objects of Measurement to Detect Spreadsheet Errors", Jul. 2005, School of Computer Science, Carnegie Mellon University, Pittsburgh, PA: http://www.andrew.cmu.edu/user/mcoblenz/CMU-CS-05-150.pdf.
Chambers et al. "Dimension Inference in Spreadsheets", IEEE Symposium on Visual Languages and Human-Centric Computing (VL/HCC'08), 123-130, 2008. http://web.engr.oregonstate.edu/~erwig/papers/DimensionInference_VLHCC08.pdf.
Abraham et al. "A Type System Based on End-User Vocabulary", IEEE Symposium on Visual Languages and Human-Centric Computing (VL/HCC'07), 215-222, 2007: http://web.engr.oregonstate.edu/~erwig/papers/EndUserTypeSystem_VLHCC07.pdf.
Erwig et al. "Adding Apples and Oranges", Fourth International Symposium on Practical Aspects of Declarative Languages, Jan. 2002: http://web.engr.oregonstate.edu/~erwig/papers/Apples_PADL02.pdf.

* cited by examiner

*Primary Examiner* — Manglesh M Patel
(74) *Attorney, Agent, or Firm* — Fletcher Yoder PC

(57) ABSTRACT

Context sensitive computations in a spreadsheet application are disclosed. In some embodiments, semantics with respect to various spreadsheet operations are specified for each of a plurality of number formats in a spreadsheet application. The semantics associated with a particular number format specify behavior for values of that number format with respect to various spreadsheet operations.

18 Claims, 3 Drawing Sheets

CONTEXT SENSITIVE COMPUTATIONS

BACKGROUND OF THE INVENTION

Some existing spreadsheet applications support only two data types: strings and numbers. Although a number can be formatted with a particular format, e.g., date, time, currency, etc., such a formatted number is still internally represented as a number and in many cases not disambiguated from other number formats. As a consequence, it is possible to perform various operations defined for the numbers data type with respect to formatted numbers, which often yield unexpected and/or nonsensical results.

For example, in some existing spreadsheet applications, numbers formatted as dates are internally represented as a fractional number of days since a prescribed epochal date (e.g., January 0, 1900), and a computation such as "January 5, 1900*January 6, 1900" results in a value of 30 since the dates "January 5, 1900" and "January 6, 1900" are internally represented as 5 and 6, respectively. Similarly, in some existing spreadsheet applications, durations are represented as a time with respect to a prescribed epochal date. In such cases, for example, a duration of 12 hours and 15 minutes is represented as "January 0, 1900 12:15 p.m.", and a computation such as "12:15*2" results in a value of "January 1, 1900 00:30 a.m.". Moreover, when a duration is less than 24 hours long, it is interpreted as a fraction of a single day. In such cases, for example, a computation such as "12:00*6:00" results in a value of 0.125 since the durations 12:00 and 6:00 are internally represented as 0.5 and 0.25, respectively. Furthermore, some existing spreadsheet applications execute mixed unit computations for some number formats without taking all of the units specified in a computation into consideration while still outputting a unit-based result. In some such cases, for example, a computation such as "$1+€1" results in a value of $2, and a computation such as "£1+€1" results in a value of £2. Thus, in many cases, existing spreadsheet applications provide incorrect, counter-intuitive, and/or meaningless results when operations are performed with respect to formatted values.

Some other existing spreadsheet applications do not allow any computations between numbers that are formatted differently and/or have dissimilar units. In such cases, for example, a computation such as "$2.00+5" results in an error since the 5 does not have the same unit as the 2.

BRIEF DESCRIPTION OF THE DRAWINGS

Various embodiments of the invention are disclosed in the following detailed description and the accompanying drawings.

DETAILED DESCRIPTION

Figure 1:
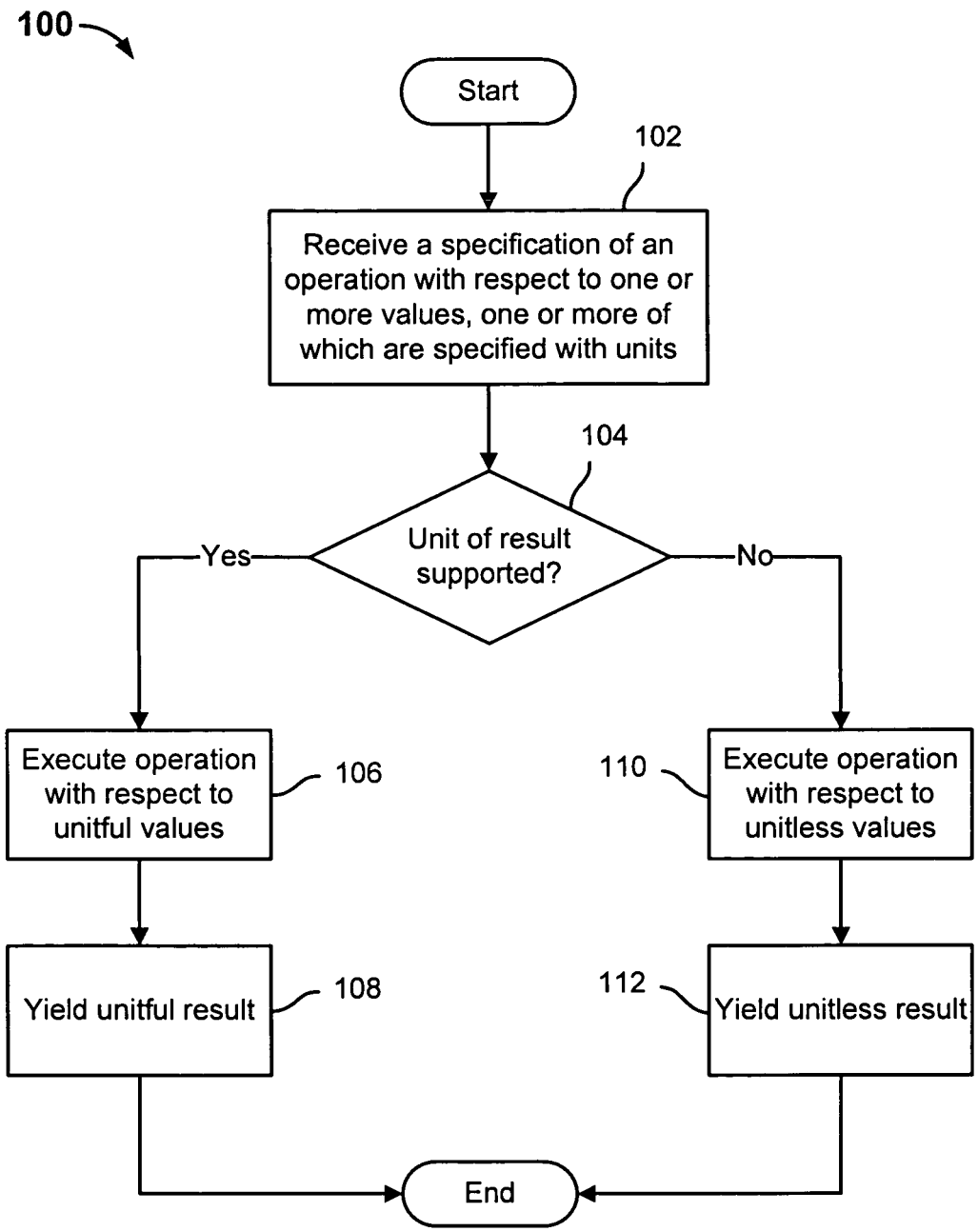
FIG. 1 illustrates an embodiment of a process for executing an operation with respect to one or mores values.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the term "cell" refers to a cell associated with at least standard spreadsheet functionality. The term "at least standard spreadsheet functionality" in the context of a cell includes the ability to define the content of one cell in such a way that the content of the one cell is determined based at least in part on the content of one or more other cells, and the content of the one cell is updated automatically without further human action if the content of one or more of the one or more other cells is changed. As used herein, the term "host cell" refers to a cell in a formula editing mode, i.e., a cell into which a formula is being entered. In some embodiments, cells in a spreadsheet application are organized into one or more individual tables or table objects, each of which includes a desired number of rows and columns of cells. In such cases, a sheet or canvas of a spreadsheet document may include a desired number of table objects as well as any desired number of other objects such as charts, graphs, images, etc. Although in some of the examples described herein the cells of a spreadsheet application are organized into such table objects, the techniques described herein may be similarly employed with respect to other cell configurations or organizations, such as the (seemingly) infinite single grid or table of cells in each sheet of some typical spreadsheet applications that includes an unlimited (or very large) number of rows and columns of cells. Although many of the examples provided herein are with respect to a spreadsheet application, the techniques described herein may be similarly employed with respect to any application, spreadsheet or otherwise.

One or more cells of a spreadsheet may be formatted to have a pre-defined or custom format such that values of the cells are represented in the selected format. A format type may be associated with a particular type of measurement or quantity and may support one or more acceptable units for representing the quantity. Examples of number formats include durations, dates, times, currencies, etc., each of which may support one or more associated units. As used herein, the terms "format" and "number format" refer to a dimension or a type of quantity (e.g., durations, dates, times, currencies, etc.) and not necessarily to other aspects that may be associated with formatting that do not have a bearing on the units associated with the format such as the number of displayed decimal places.

In some embodiments, one or more different number formats may each be defined as a distinct data type. Each data type may be associated with its own semantics so that nonsensical results can be prevented from occurring, e.g., in computations in a spreadsheet application. The semantics associated with a data type may include a specification of permissible operations for values of that data type, a specification of other data types whose values may be employed in computations with values of that data type, a specification for handling computations having mixed units, etc.

In some embodiments, one or more of durations, dates/times, and currencies are each defined as a distinct data type and/or are each associated with their own semantics with respect to various spreadsheet operations. Although some of the given examples are with respect to durations, dates/times, and/or currencies, the described techniques may be analogously employed with respect to any other formats and/or data types. For example, one or more other dimensions or quantities such as length, mass, weight, volume, temperature, etc., may each be defined as a distinct data type and/or be associated with prescribed semantics for handling values of that quantity in spreadsheet computations.

In the context of a spreadsheet, a "computation" includes formulas and/or any other spreadsheet features or functions that operate on the values of one or more cells to yield a result. In various embodiments, a computation may include one or more operations such as arithmetic operations (e.g., addition, subtraction, multiplication, division, etc.) and/or other pre-defined or custom functions (e.g., sum, average, standard deviation, etc.) with respect to one or more values, one or more of which may have units. If a particular operation is permissible for the values specified with respect to the operation, in various embodiments, the operation is executed on unitless or unitful values to yield a unitless or unitful result based on the type of the operation and/or the units of the values specified, if any. In some embodiments, if unitless values are specified with respect to an operation, the operation is executed on unitless values to yield a unitless result.

In some embodiments, durations are defined as a distinct data type. A duration measures a period of time. Example units of durations include milliseconds, seconds, minutes, hours, days, weeks, months, years, etc. In some embodiments, each specified duration value is internally represented as a number of seconds (or other prescribed duration unit) paired with a tag indicating the unit specified for the value so that a number based on the specified unit (i.e., the actual number specified in the input) can be employed in computations.

Table 1 illustrates embodiments of various semantics associated with durations with respect to basic arithmetic operations (i.e., addition, subtraction, multiplication, and division). As depicted, when appropriate, a unitful result is provided. However, when an ambiguity exists in the units specified, e.g., because mixed units are specified, and/or the unit of the result is not supported, a unitless result is provided. The various operations of Table 1 as well as other examples are further described in detail below.

TABLE 1

| OPERATION TYPE | | EXAMPLE | RESULT |
|---|---|---|---|
| Addition & Subtraction | duration ± duration of same unit = duration with unit | 12 hours − 6 hours | 6 hours |
| | duration ± duration of different unit = duration with unit | 12 hours − 30 minutes | 11.5 hours |
| | duration ± dissimilar type = unitless result | 6 hours − $1.00 | 5 |
| | duration ± unitless value = unitless result | 6 hours 30 minutes + 0.5 | 7 |
| Multiplication & Division | duration * duration of same unit = unitless result | 6 hours * 12 hours | 72 |
| | duration * duration of different unit = unitless result | 6 hours 15 minutes * 180 minutes | 18.75 |
| | duration/duration of same unit = unitless result | 6 hours 45 minutes/12 hours | 0.5625 |
| | duration/duration of different unit = unitless result | 6 hours/30 minutes | 12 |
| | duration * or/dissimilar type = unitless result | 6 hours * $2 | 12 |
| | duration * or/unitless value = duration with unit | 6 hours * 12 | 72 hours |

In some embodiments, an addition/subtraction operation with respect to a plurality of duration values expressed in the same unit yields a duration result having the same unit. In the example given in Table 1, the computation "12 hours−6 hours" yields a result of 6 hours. In some such cases, if a value is expressed using a plurality of unit components, the value is converted to the maximum unit component specified for that value prior to the computation, if applicable. For example, the computation "12 hours 30 minutes−6 hours" is transformed into "12.5 hours−6 hours", which yields a result of 6.5 hours.

In some embodiments, an addition/subtraction operation with respect to a plurality of duration values expressed in at least two different units yields a duration result. In some such cases, the values are all converted to the same unit prior to executing an associated operation. For example, all values are converted to the maximum unit component specified for the first or leftmost value in the computation, and an operation is executed on such unitful values to yield a unitful result. In the example given in Table 1, the computation "12 hours−30 minutes" is transformed into "12 hours−0.5 hours", which yields a unitful result of 11.5 hours. Thus, in some embodiments, mixed unit values of the same dimension and/or data type are all converted to the same unit prior to performing an operation. This allows computations such as "12 hours−30 minutes" and "12 hours−30 seconds" to be disambiguated.

In some embodiments, an addition/subtraction operation with respect to at least one duration value and at least one value that is unitless and/or of a dissimilar type or dimension yields a unitless result, e.g., due to the ambiguity of mixed units. In some such cases, each value specified with a unit is converted to the maximum unit component specified for that value, if applicable; units are stripped from the values specified with units; and an operation is executed on unitless values to yield a unitless result. In the example given in Table 1, the computation "6 hours−$1.00" is transformed into "6−1", which yields a unitless result of 5; and the computation "6 hours 30 minutes+0.5" is transformed into "6.5+0.5", which yields a unitless result of 7.

In some embodiments, a multiplication operation with respect to a plurality of duration values expressed in the same unit yields a unitless result, e.g., because the unit of the result is not supported. In some such cases, each value is converted to the maximum unit component specified, if applicable; the units are stripped from the values; and an operation is executed on unitless values to yield a unitless result. In the example given in Table 1, the computation "6 hours*12 hours" is transformed into "6*12", which yields a unitless result of 72. In the given example, even though "hours" is a supported unit, "hours$^2$" is not, and so the operation is performed with respect to unitless values to yield a unitless result. In other embodiments, if the unit of the result is supported, the operation is performed with respect to unitful values to yield a unitful result. In such a case, for example, the computation "6 hours*12 hours" would yield a unitful result of 72 hours$^2$.

In some embodiments, a multiplication operation with respect to a plurality of duration values expressed in at least two different units yields a unitless result, e.g., because the unit of the result is not supported. In some such cases, the values are all first converted to the same unit. For example, all values are first converted to the maximum unit component specified for the first or leftmost value, the units are stripped from the converted values, and an operation is executed on unitless values to yield a unitless result. In the example given in Table 1, the computation "6 hours 15 minutes*180 minutes" is transformed into "6.25*3", which yields a unitless result of 18.75. In the given example, even though "hours" is a supported unit, "hours$^2$" is not, and so the operation is performed with respect to unitless values to yield a unitless result. In other embodiments, if the unit of the result is supported, the operation is performed with respect to unitful values to yield a unitful result. In such a case, for example, the computation "6 hours 15 minutes*180 minutes" would be transformed into "6.25 hours*3 hours" to yield a unitful result of 18.75 hours$^2$.

In some embodiments, a division operation with respect to a pair of duration values expressed in the same unit yields a unitless result, e.g., because the units cancel. In the example given in Table 1, the computation "6 hours 45 minutes/12 hours" yields a unitless result of 0.5625. In some such cases, "6 hours 45 minutes" is first converted to the maximum unit component specified for the value, i.e., "6.75 hours", prior to the computation. In other implementations, such a conversion may not be necessary, such as, for example, in the cases in which all duration values are internally stored in the same unit (e.g., seconds) with an associated tag that indicates actual units.

In some embodiments, a division operation with respect to a plurality of duration values expressed in at least two different units yields a unitless result, e.g., because the units cancel. In some such cases, the values are all first converted to the same unit. For example, all values are first converted to the maximum unit component specified for the first or leftmost value prior to the operation. In the example given in Table 1, the computation "6 hours/30 minutes" is transformed into "6 hours/0.5 hours", which yields a unitless result of 12. In other implementations, such a conversion may not be necessary, such as, for example, in the cases in which all duration values are internally stored in the same unit (e.g., seconds) with an associated tag that indicates actual units.

In some embodiments, a multiplication/division operation with respect to at least one duration value and at least one value of a dissimilar type or dimension yields a unitless result, e.g., because the unit of the result is not supported. In some such cases, each value is first converted to the maximum unit component specified for that value, if applicable; units are stripped from the values; and an operation is executed on unitless values to yield a unitless result. In the example given in Table 1, the computation "6 hours*$2" is transformed into "6*2", which yields a unitless result of 12. In this case, although "hours" and "$" are supported units, the unit of the result "hours$" is not supported, and so the operation is performed with respect to unitless values to yield a unitless result. In other embodiments, if the unit of the result is supported, the operation is performed with respect to unitful values to yield a unitful result.

In some embodiments, a multiplication/division operation with respect to at least one duration value and at least one unitless value yields a unitful result, e.g., because the unit of the result is supported. In the example given in Table 1, the computation "6 hours*12" yields a unitful result of 72 hours. Similarly, the computation "6 hours/12" yields a unitful result of 0.5 hours. In some cases, a value specified with multiple unit components may be first converted to a maximum unit component specified for the value. For example, the computation "6 hours 30 minutes*12" is transformed into "6.5 hours*12", which yields a unitful result of 78 hours. In some embodiments, a multiplication/division operation with respect to at least one duration value and at least one unitless value yields a unitless result, e.g., because the unit of the result is not supported. In some such cases, each value is first converted to the maximum unit component specified for that value, if applicable; units are stripped from values specified with units; and an operation is executed on unitless values to yield a unitless result. For example, the computation "6/12 hours 30 minutes" is transformed into "6/12.5", which yields a unitless result of 0.48 since the unit hours$^{-1}$ is not supported in the given example.

In some embodiments, a standard deviation function may be applied to a set of durations to yield a duration result. In some such cases, one or more of the argument duration values may be converted to the same unit and/or to a maximum specified unit prior to executing the standard deviation function. Although Table 1 and the associated description provide some examples of the semantics of duration values, in various embodiments, the semantics may include specifications of one or more other allowed spreadsheet operations and/or units of other values that are allowed with respect to one or more allowed operations as well as specifications of one or more operations and/or units of other values that are not allowed, e.g., that would result in errors to be generated if attempted. In some embodiments, warnings are generated with respect to certain operations that are allowed but may indicate mistakes on the part of a user. For example, in some embodiments, warnings are generated for operations that require units to be stripped.

In some embodiments, dates and/or times are defined as a distinct data type. Example units of dates include day of week, day of month, month, year, etc., and example units of times include hour, minute, second, etc. In some embodiments, the semantics associated with dates/times include specifications of permissible and/or forbidden operations for date/time values as well as other units that may be employed with the various allowed operations. In some embodiments, warnings and/or errors may be associated with respect to various operations including date/time values. For example, in some embodiments, multiplication/division operations are not allowed for date/time values since it does not make sense to multiply/divide dates and times with any type of quantity. In such cases, for example, computations such as "January 5, 1900*January 6, 1900" and "5:35 p.m./30 hours" result in errors. In some embodiments, addition/subtraction operations with duration values are permitted for date/time values and result in a corresponding date/time in the future/past. For example, the computation "September 21, 2008+2 days" results in a date of September 23, 2008; and the computation "12:00 p.m.−2 hours" results in a time of 10:00 a.m. However, addition/subtraction operations may not be permitted with other dimensions or data types and/or unitless values. For example, computations such as "September 5, 2008+July 19, 2008", "June 2, 2008−$12.34", "12:00 p.m.+3 p.m.", and "12−4:30 p.m." result in errors. In some embodiments, the standard deviation function may be employed with a set of date/time values to yield a duration result. Although some examples have been provided, the semantics associated with dates/times may include a complete specification of the operations that are allowed and/or not allowed for date/time values.

In some embodiments, currencies are defined as a distinct data type. Example units of currencies include $, £, €, ¥, etc. In some embodiments, the semantics associated with currencies include a specification of the operations that are permissible and/or forbidden for currency values as well as a specification of allowed units of other values with respect to one or more allowed operations. In some embodiments, operations on currency values of the same unit yield a result of that currency unit or a unitless value if the units cancel out or are not supported. For example, the computation "£4+£5" yields a unitful result of £9; the computation "€10/€2" yields a unitless result of 5 since the units cancel; and the computation "$4*$5" is transformed into "4*5" which yields a unitless result of 20 since a unit of $^2$ is not supported in the given example. In some embodiments, operations between currency values of different units are not permitted and result in errors. Since users typically do not perform operations on values of disparate currency units, it is useful to disallow such operations so that user errors can be avoided. In such cases, for example, computations such as "$1+€1" and "£1*€1" result in errors. Alternatively, in some embodiments, operations between currency values of different units may be permitted, and the units may be stripped so that an operation is executed on unitless values to yield a unitless result. In such cases, for example, the computation "$1+€1" is transformed into "1+1", which yields a unitless result of 2; and the computation "£1*€1" is transformed into "1*1", which yields a unitless result of 1. In some such cases, warnings may be generated to indicate that the units of the input values do not match. In some embodiments, operations with respect to other units may be permitted. In some such cases, each value specified with units is converted to a maximum unit specified, if applicable; units are stripped from the values; and an operation is executed on unitless values to yield a unitless result. For example, the computation "$4+5 hours" is transformed into "4+5", which yields a unitless result of 9; and the computation "12 hours 30 minutes/€2" is transformed into "12.5/2", which yields a unitless result of 6.25. In some operations between a currency value of a prescribed unit and a unitless value, the currency unit may be preserved. For example, the computation "$5*5" yields a unitful result of $25. Although some examples have been provided, the semantics associated with currencies may include a complete specification of the operations that are allowed and/or not allowed for currency values.

Although in some of the described embodiments, various number formats (e.g., durations, dates/times, currencies, etc.) are each associated with a distinct data type, the described techniques are not limited to number formats represented as distinct data types. That is, prescribed semantics with respect to spreadsheet operations may be associated with each of one or more different number formats (or dimensions) that are not defined as distinct data types (e.g., one or more number formats may comprise one or more of the same data types, such as a numbers data type).

FIG. 1 illustrates an embodiment of a process for executing an operation with respect to one or mores values. Process 100 starts at 102 at which at which a specification of an operation with respect to one or more values, one or more of which are specified with units, is received. At 104, it is determined if the unit of the result of the operation is supported. If it is determined at 104 that the unit of the result is supported, the operation is executed with respect to unitful values at 106. A unitful result having the appropriate unit is yielded at 108, and process 100 subsequently ends. In some embodiments, a unitless result may be yielded at 108, e.g., if the units cancel in the operation executed at 106. If it is determined at 104 that the unit of the result is ambiguous or not supported, the operation is executed with respect to unitless values at 110. A unitless result is yielded at 112, and process 100 subsequently ends.

Figure 2:
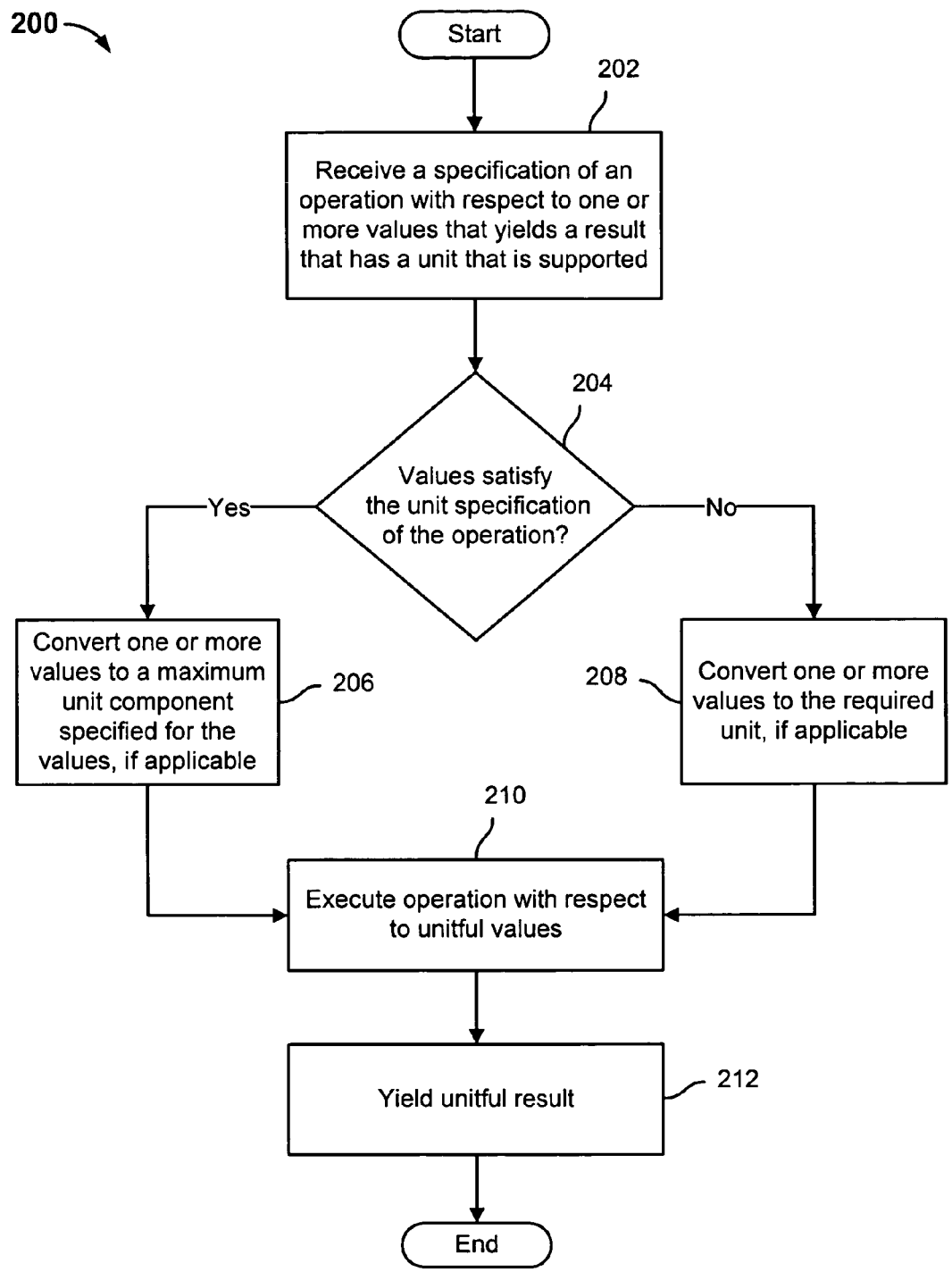
FIG. 2 illustrates an embodiment of a process for executing an operation with respect to one or mores values that yields a result that has a unit that is supported.

FIG. 2 illustrates an embodiment of a process for executing an operation with respect to one or mores values that yields a result that has a unit that is supported. For example, process 200 may be employed with respect to 106 and 108 of process 100. Process 200 starts at 202 at which a specification of an operation with respect to one or more values that yields a result that has a unit that is supported is received. In some such cases, at least one of the one or more values is expressed with units. At 204, is determined whether the values satisfy the unit specification of the operation. In some embodiments, for example, for an addition/subtraction operation between two duration values, it is determined at 204 whether both values are expressed in the same unit. If it is determined at 204 that the values satisfy the unit specification of the operation, one or more of the values expressed with units are converted to a maximum unit component specified for the values, if applicable, at 206, and process 200 proceeds to 210. If it is determined at 204 that the values do not satisfy the unit specification of the operation, one or more values expressed with units are converted to the required (e.g., the same) unit, if applicable, at 208, and process 200 proceeds to 210. In some embodiments, at 208 all of the values expressed with units are converted to the maximum unit component specified for the first or leftmost value expressed with a unit specified with respect to the operation. At 210, the operation is executed with respect to unitful values. A unitful result having the appropriate unit is yielded at 212, and process 200 subsequently ends. In some embodiments, the result yielded at 212 may be unitless, e.g., if the units cancel in the operation executed at 210.

In some embodiments, the specification of 202 comprises a specification of an operation with respect to at least one value of a prescribed unit and one or more unitless values. In some such cases, one or more of steps 206, 210, and 212 of process 200 may be employed as applicable. For example, steps 206, 210, and 212 of process 200 may be employed for a computation such as "4 hours 30 minutes*5" to yield a unitful result of 22.5 hours at step 212.

Figure 3:
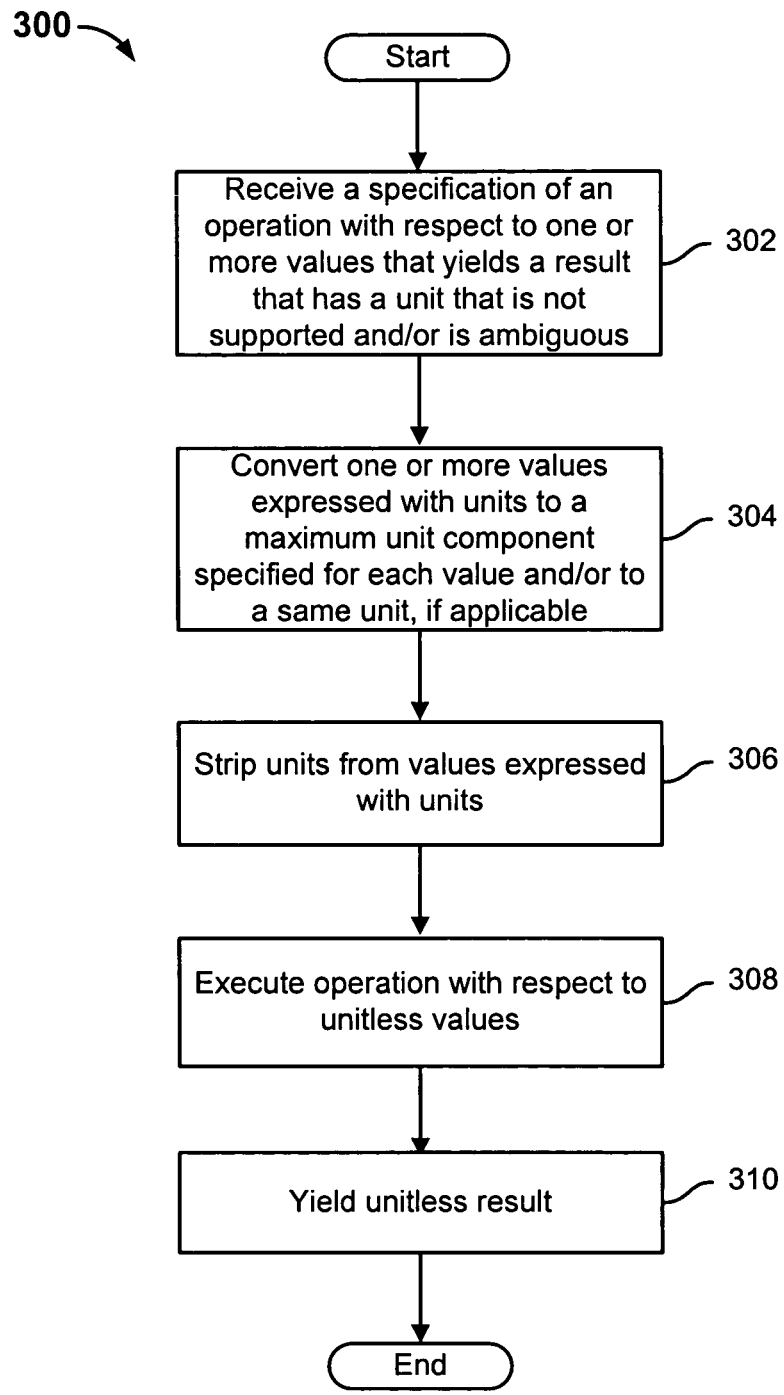
FIG. 3 illustrates an embodiment of a process for executing an operation with respect to one or more values that yields a result that has a unit that is not supported and/or is ambiguous.

FIG. 3 illustrates an embodiment of a process for executing an operation with respect to one or more values that yields a result that has a unit that is not supported and/or is ambiguous. For example, process 300 may be employed with respect to 110 and 112 of process 100. Process 300 starts at 302 at which a specification of an operation with respect to one or more values that yields a result that has a unit that is not supported and/or is ambiguous is received. At 304, one or more values expressed with units are converted to a maximum unit component specified for each value and/or to the same unit, if applicable. In some embodiments, 304 includes converting one or more values specified with different units of a same dimension to a consistent unit of the dimension. For example, in some cases, all of the values expressed with units of the same dimension are converted to the maximum unit component specified for the first or leftmost value expressed with a unit of that dimension specified with respect to the operation. At 306, units are stripped or removed from the values expressed with units, and the operation is executed with respect to unitless values at 308. In some embodiments, a warning may be generated at 306 and/or 308 to indicate that units are being stripped. At 310, a unitless result is yielded, and process 300 subsequently ends.

As described herein, it is in many cases advantageous to separately define the semantics of various spreadsheet operations with respect to different number formats or dimensions. The semantics associated with a particular number format define the behavior of that number format with respect to various operations and/or other formats or types. In some cases, the defined behavior may be specified to reflect expected behavior with values of that format or data type so that meaningful results can be provided for various types of operations. For example, in some cases, warnings may be generated with respect to certain operations to alert users of potential mistakes, and errors may be generated with respect to disallowed operations to prevent users from making mistakes. Furthermore, in many cases of operations with respect to mixed units that yield results that have ambiguous and/or unsupported units, the operations are executed with respect to unitless values based on the actual input values and yield unitless results. The described techniques facilitate providing the most meaningful result based on the actual values and/or associated units specified with respect to an operation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer program product for processing spreadsheet data, the computer program product being embodied in one or more non-transitory computer readable storage media and comprising computer instructions for:
   prior to executing an operation, determining if a resulting quantitative unit of a result of the operation with respect to one or more values is not supported when the resulting quantitative unit is not within a defined range of supported spreadsheet units associated with a format of the one or more values or is ambiguous when mixed quantitative units are specified for the one or more values, wherein each of at least a subset of the one or more values is specified with quantitative units;
   when the resulting quantitative unit is not supported, stripping the quantitative units of the at least subset of the one or more values prior to executing the operation;
   executing the operation to yield a numeric result; and
   displaying the numeric result without quantitative units when the resulting unit is not supported, is ambiguous, or both.

2. The computer program product recited in claim 1, wherein the operation is executed at least in part with respect to actual specified values.

3. The computer program product recited in claim 1, comprising automatically converting any values expressed with different but compatible units into a consistent unit by converting each value specified with multiple units into the consistent unit.

4. The computer program product recited in claim 1, wherein one or more values in the subset is specified with different units of a same dimension.

5. The computer program product recited in claim 1, further comprising computer instructions for generating a user warning indicating that units will be stripped when executing the operation.

6. The computer program product recited in claim 1, wherein the one or more values include at least one unitless value.

7. A system for processing spreadsheet data, comprising:
   one or more processors configured to execute instructions which, when executed, cause the one or more processors to:
      prior to executing an operation, determine if a resulting quantitative unit of a result of the operation with respect to one or more values is not supported when the resulting quantitative unit is not within a defined range of supported spreadsheet units associated with a format of the one or more values or is ambiguous when mixed quantitative units are specified for the one or more values, wherein each of at least a subset of the one or more values is specified with quantitative units;
      when the resulting quantitative unit is not supported, stripping the quantitative units of the at least subset of the one or more values prior to executing the operation;
      executing the operation to yield a numeric result; and
      displaying the numeric result without quantitative units when the resulting unit is not supported, is ambiguous, or both; and
   one or more memories coupled to the one or more processors and configured to provide the one or more processors with the instructions.

8. The system recited in claim 7, wherein the operation is executed at least in part with respect to actual specified values.

9. The system recited in claim 7, wherein the one or more processors are configured to execute instructions which, when executed, cause the one or more processors to automatically convert any values expressed with different but compatible units into a consistent unit by converting each value specified with multiple units into the consistent unit.

10. The system recited in claim 7, wherein one or more values in the subset is specified with different units of a same dimension.

11. The system recited in claim 7, wherein the one or more processors are configured to execute instructions which, when executed, cause the one or more processors to generate a user warning indicating that units will be stripped when executing the operation.

12. The system recited in claim 7, wherein the one or more values include at least one unitless value.

13. A method for processing spreadsheet data, comprising:

prior to executing an operation, determining, via one or more processors, if a resulting quantitative unit of a result of the operation with respect to one or more values is not supported when the resulting quantitative unit is not within a defined range of supported spreadsheet units associated with a format of the one or more values or is ambiguous when mixed quantitative units are specified for the one or more values, wherein each of at least a subset of the one or more values is specified with quantitative units;

when the resulting quantitative unit is not supported, stripping the quantitative units of the at least subset of the one or more values prior to executing the operation;

executing, via the one or more processors, the operation to yield a numeric result; and displaying, via the one or more processors, the numeric result without quantitative units when the resulting unit is not supported, is ambiguous, or both.

14. The method recited in claim 13, wherein the operation is executed at least in part with respect to actual specified values.

15. The method recited in claim 13, comprising automatically converting any values expressed with different but compatible units into a consistent unit by converting each value specified with multiple units into the consistent unit.

16. The method recited in claim 13, wherein one or more values in the subset is specified with different units of a same dimension.

17. The method recited in claim 13, comprising generating a user warning indicating that units will be stripped when executing the operation.

18. The method recited in claim 13, wherein the one or more values include at least one unitless value.

\* \* \* \* \*